July 6, 1926. 1,591,845
L. KURTZ
FLOWER HOLDER
Filed Sept. 15, 1924
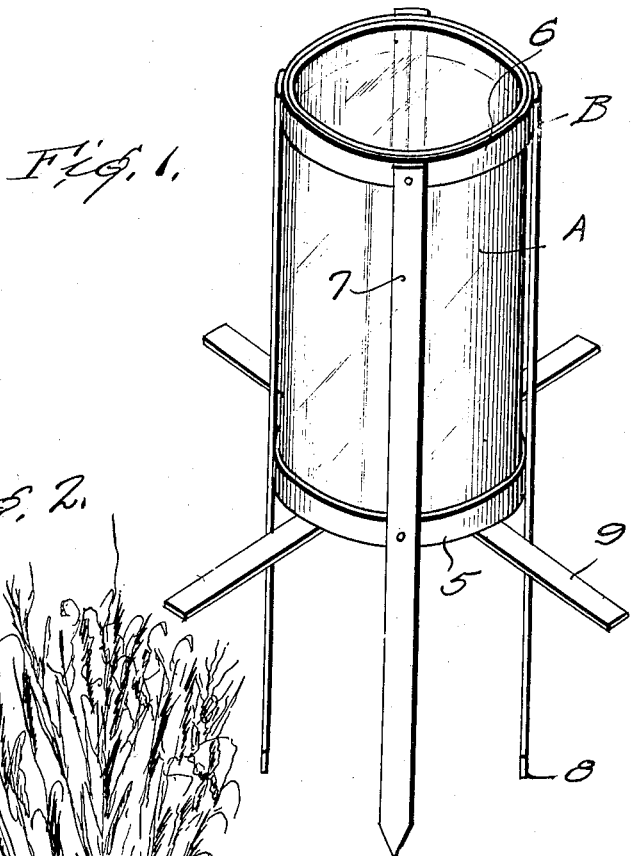
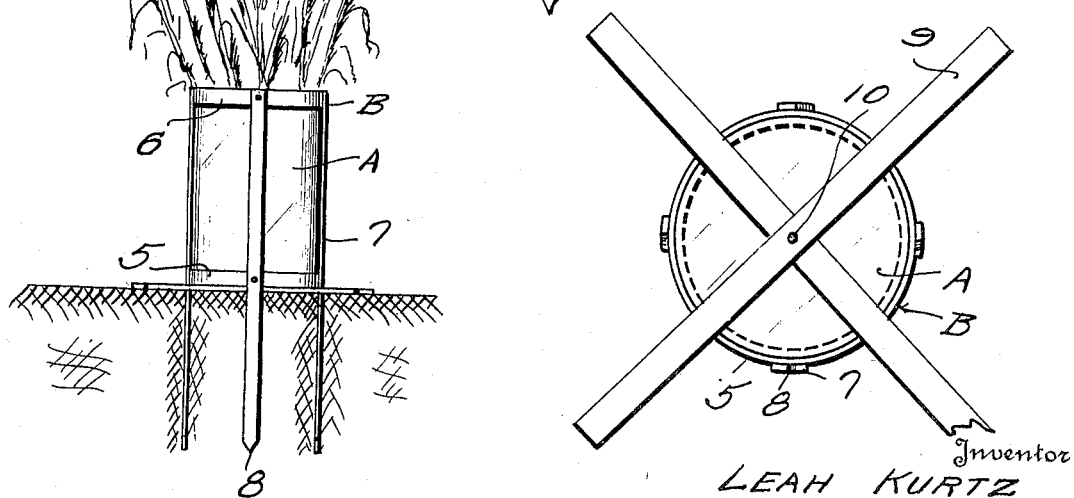

Patented July 6, 1926.

1,591,845

UNITED STATES PATENT OFFICE.

LEAH KURTZ, OF SHEBOYGAN, WISCONSIN.

FLOWER HOLDER.

Application filed September 15, 1924. Serial No. 737,928.

The present invention appertains to a flower holder and is constructed of a rough proof metal frame for holding a glass container or the like. The frame is possessed of a very simple and efficient construction for holding the glass container on the ground or the like so as to prevent the same from becoming upset. The frame is capable of being engaged in the ground without unnecessarily destroying the grass or sod as is the case with the ordinary flower container having a conical formation. The glass container is readily removed from the frame without the necessity of disturbing the latter.

A very important object of the invention is to provide a device of this nature which is capable of being manufactured at a very small cost and which will yet be durable, strong, attractive in appearance, reliable, and otherwise well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a perspective view of the device embodying the features of my invention, Figure 2 is a side elevation thereof showing the flowers therein and Figure 3 is a bottom plan view thereof.

Referring to the drawing in detail it will be seen that the glass container is indicated by the letter A while the frame is indicated generally by the letter B. The container may be made of any other suitable material but glass is preferred. This container is of a cylindrical formation having its bottom end closed.

The frame B includes a pair of hoops 5 and 6 held in spaced relation to each other by a plurality of legs 7. The upper ends of these legs 7 are riveted or otherwise fastened to the hoop 6 while their intermediate portions are riveted or otherwise fastened to the hoops 5. The lower ends of the legs are pointed as indicated at 8.

A steadying device is associated with the frame for preventing it from tilting when the container A is filled with flowers. This steadying device consists of two bars 9 which are crossed at their intermediate portion and extend at right angles to each other. The intermediate portions are preferably fixed together as at 10. These bars 9 are suitably fixed to the hoop 5 by being soldered or welded thereto thus forming an integral part of the frame.

In using the device the lower portions of the legs 7 are forced into the ground as indicated in Figure 2 and the setting device consisting of the bars 9 rests on top of the ground. It will thus be seen that it will be very difficult to tilt the container when once in the frame in this position and that comparatively tall flowers may be placed in the container and there is very little likelihood of the same becoming upset. The device will do practically no injury to the soil or sod and may be easily engaged with or disengaged from the ground.

Although I have described the preferred embodiment of the invention it is to be understood that numerous changes in the details of construction, and in the combination and arrangement of parts may be resorted to without departing from the spirit or scope of the invention as hereinafter claimed or sacrificing any of its advantages.

Having thus described my invention, what I claim as new is:

1. In a device of the class described, a frame consisting of a pair of spaced hoops, a plurality of legs fixed to the hoops and extending beyond one hoop, the portions of the legs extending beyond one hoop being pointed, and a steadying device fixed to the latter mentioned hoop, and a container insertable in the hoops and adapted to rest on the steadying device.

2. In a device of the class described, an upper and a lower hoop, said hoops being spaced from each other, a plurality of legs each having one end fixed to the upper hoop and its intermediate portion fixed to the lower hoop and extending therebeyond so as to terminate in points, a steadying device fixed to the lower hoop consisting of a pair of cross bars extending outwardly between the legs.

3. In a device of the class described, a frame comprising a pair of spaced hoops, a plurality of legs connected to the said hoops and extending downwardly below the lower hoop, the extremities of the said legs being pointed, and a plurality of steadying bars extending transversely below the bottom hoop outwardly beyond the said legs.

4. In a device of the class described, a frame comprised of a pair of spaced hoops, a plurality of legs secured to the said hoops and extending downwardly from the lower hoop and terminating in a point, a plurality of cross bars mounted beneath the lower hoop extending outwardly beyond the legs for steadying the frame, and a container removably mounted in the said hoops.

5. In a device of the class described, a frame comprising container engaging means, a plurality of legs fixed to the container engaging means and extending downwardly therefrom for engagement with the ground, and means for firmly retaining the frame in a vertical position comprising laterally projecting members extending substantially from the frame adapted to engage the ground and brace the frame in its vertical position.

In testimony whereof I affix my signature.

LEAH KURTZ.